(No Model.)
P. DUNN & T. HARRIS.
BARBED WIRE FENCE NAIL.
No. 324,310. Patented Aug. 11, 1885.
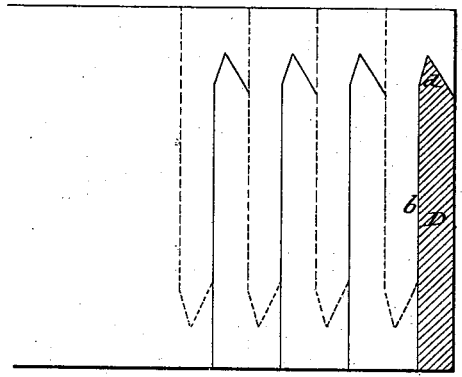
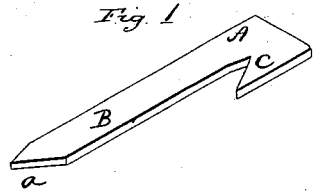
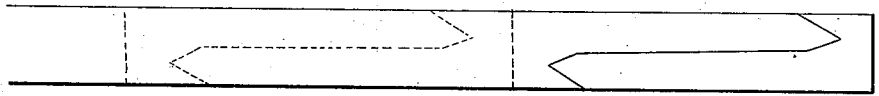
Witnesses.
Patrick Dunn & Thomas Harris
Inventors.
By Atty.

UNITED STATES PATENT OFFICE.

PATRICK DUNN, OF CÔTE ST. PAUL, QUEBEC, CANADA, AND THOMAS HARRIS, OF SEYMOUR, CONNECTICUT; SAID DUNN ASSIGNOR TO CARLOS FRENCH, OF SEYMOUR, CONNECTICUT.

BARBED-WIRE-FENCE NAIL.

SPECIFICATION forming part of Letters Patent No. 324,310, dated August 11, 1885.

Application filed July 1, 1885. (No model.)

*To all whom it may concern:*

Be it known that we, PATRICK DUNN, of Côte St. Paul, county of Hochelaga, Province of Quebec, Canada, and THOMAS HARRIS, of Seymour, in the county of New Haven and State of Connecticut, have invented a new Improvement in Barbed-Wire-Fence Nails; and we do hereby declare the following, when taken in connection with accompanying drawings and the letters of reference marked thereon, to be a full, clear, and exact description of the same, and which said drawings constitute part of this specification, and represent, in—

Figure 1, a perspective view of the nail; Fig. 2, a diagram illustrating the method of cutting the nails successively from a strip transversely across the strip; Fig. 3, a diagram illustrating the method of cutting the nail longitudinally from a strip.

This invention relates to an improvement in the construction of the nail used for securing the wire to the posts in barbed-wire fence.

These nails are required to be of staple-like form, so that driven into the post they will embrace and firmly hold the wire, and it is also desirable that there shall be but one leg of any considerable length, the second leg, which gives to it the staple-like character, being only of sufficient length to fully embrace the wire, and the shape of the nail at the junction of the two legs should be such as to grip the wire and prevent its slipping longitudinally.

These nails have been produced in various shapes to accomplish this object. They have been forged to the required shape, and they have also been cut; but in the latter case there is usually a very considerable waste in the production.

The object of our invention is not only to make an improved form of nail, but to make it of such form that its construction is simple, and that no waste will occur in their manufacture; and the invention consists in the nail hereinafter described, and more particularly recited in the claim.

The nail consists of the head A, with a long leg, B, extending from one side, and with a short leg, C, from the opposite side. The space between the two legs at the head is of V shape, the apex toward the head, and so that the leg C terminates in a point, as seen in Fig. 1. The leg B also terminates in a point, *a*, the shape of this point *a* corresponding to the V-shaped space between the two legs at the head, and the width of the legs is substantially one-half the width of the head, and so that the two nails set together, as seen in Fig. 2, the point of one will stand in the space at the opposite end of the other, and so that when so set together the outer edges become parallel.

The best method of producing these nails is that indicated in Fig. 1, and to do which a cutter, D, is made, corresponding in shape to the dark portion at the left. One side, *b*, of this cutter is straight, and so as to make a straight longitudinal cut, and adapted to cut the inside of the leg, and at the head edge of the cutter it is of inverted-V shape, as at *d*, corresponding to the V-shaped space between the two legs, the width of the cutter from the point edge to the opposite edge is equal to the length of the nail complete, and is straight, as indicated in Fig. 1.

The strip from which the nails are to be cut is in width equal to the length of one nail plus the distance from the apex of the space between the legs to the face of the head, and as seen in Fig. 1. This sheet is presented to the cutter, as seen in Fig. 1, so that one edge comes in line with the side of the cutter opposite the V-shaped edge *d*. In that condition a cut is made, as indicated in Fig. 1. This shapes the inside of the principal leg and the recess between the two, leaving the shorter leg pointed, as shown. This cut made, the plate is then turned upside down, and so as to bring the opposite edge into line with the side of the cutter opposite the V-shaped edge *d*, but the plate advanced to the width of the leg; then a second cut made like the first, which will shape the point of one nail and cut it from the sheet, forming the outside edge of the nail at the same time. This leg so cut leaves the inside of the second nail and the space between the two legs of that second nail complete, the first nail being delivered from the cutter complete. Then the plate is again inverted, and the second nail cut, completing that second and partially forming the third, and so on, each successive nail cut from the sheet leaving the reverse sides of the next nail shaped at the end of the strip, and thus continuing until the strip is consumed. After the first cut is made to shape the inside of the first leg and form the space between the two legs there is no waste in the material.

Another method of cutting the nails is from a strip in width equal to a single nail, and then by a cutter of a shape corresponding at one edge to the point of one nail and its opposite edge to the point of the other nail, as indicated in Fig. 3, the nails will be successively cut from the strip, the strip being transversely cut between the heads of adjacent nails, as indicated in broken lines, Fig. 3. In this case, as before, there is no waste in the manufacture of the nail. The nail itself thus produced has the required V-shaped space between the two legs to embrace and grasp the wire, and the principal leg is of the most desirable shape for driving, corresponding as it does to the V-shaped space between the two legs.

The nail is not only exceedingly cheap in manufacture, but is of the strongest possible character, readily driven, not liable to displacement, and is as small as consistent with the strength required.

We claim—

The herein-described barbed-wire-fence nail, consisting of the head A, the principal leg, B, extending therefrom, in width substantially half the width of the head, the side of the head opposite the leg parallel with the outside of the leg, the point of the nail V-shaped, and the space between the two legs at the head end corresponding to the V shape of the point, substantially as described.

PATRICK DUNN.
THOMAS HARRIS.

Witnesses to Dunn:
HENRY COPELAND,
A. BROSOM.

Witnesses to Harris:
LILLIAN D. KELSEY,
FRED C. EARLE.